(12) United States Patent
Khan et al.

(10) Patent No.: US 8,181,476 B2
(45) Date of Patent: May 22, 2012

(54) COMPOSITE DOORS FOR TRANSPORT REFRIGERATION UNIT

(75) Inventors: Shafi N. Khan, Cicero, NY (US); Robert S. Simeone, Bridgeport, NY (US)

(73) Assignee: Carrier Corporation, Farmington, CT (US)

( * ) Notice: Subject to any disclaimer, the term of this patent is extended or adjusted under 35 U.S.C. 154(b) by 941 days.

(21) Appl. No.: 12/280,083

(22) PCT Filed: Feb. 24, 2006

(86) PCT No.: PCT/US2006/006695
§ 371 (c)(1),
(2), (4) Date: Aug. 20, 2008

(87) PCT Pub. No.: WO2007/106067
PCT Pub. Date: Sep. 20, 2007

(65) Prior Publication Data
US 2010/0162743 A1    Jul. 1, 2010

(51) Int. Cl.
*B60H 1/32* (2006.01)
(52) U.S. Cl. .......................................................... 62/244
(58) Field of Classification Search ................. 62/259.1, 62/404, 449
See application file for complete search history.

(56) References Cited

U.S. PATENT DOCUMENTS

| 4,078,395 | A | | 3/1978 | Crowe et al. |
| 4,182,134 | A | * | 1/1980 | Viegas et al. ................... 62/298 |
| 4,348,871 | A | | 9/1982 | Androff |
| 4,365,484 | A | * | 12/1982 | Carson et al. ................... 62/239 |
| 4,526,831 | A | | 7/1985 | Hatchadoorian et al. |
| 4,551,986 | A | | 11/1985 | Anderson et al. |
| 4,736,597 | A | | 4/1988 | Anderson et al. |
| 5,168,621 | A | | 12/1992 | Kruck et al. |
| 5,388,424 | A | * | 2/1995 | Chopko et al. ................... 62/239 |
| 5,927,090 | A | * | 7/1999 | Ladendorf et al. .............. 62/239 |
| 5,960,637 | A | | 10/1999 | Stevens et al. |
| 6,907,747 | B2 | | 6/2005 | Laizer |

OTHER PUBLICATIONS

International Search Report and Written Opinion from Application No. PCT/US06/06692 mailed Aug. 11, 2008 (8 pgs.).
International Preliminary Report on Patentability from Application No. PCT/US06/06692 mailed Sep. 18, 2008 (5 pgs.).

* cited by examiner

*Primary Examiner* — Melvin Jones
(74) *Attorney, Agent, or Firm* — Cantor Colburn LLP

(57) ABSTRACT

The front cover of a transport refrigeration unit includes a plurality of hinged access doors, with each door being formed of a pair of spaced thermoplastic olefin sheets with their edges being bonded along the entire periphery of the door to form a hollow space between the sheets without a need for foam. The edges are bonded by a thermoforming process which provides strength and rigidity to the door. Additional thermoforming bonds are made at locations other than the periphery to provide further strength and rigidity. A ribbing structure is formed in one of the sheets and extends around the periphery thereof. Further ribbing may extend transversely across the sheet in non-peripheral positions.

23 Claims, 8 Drawing Sheets

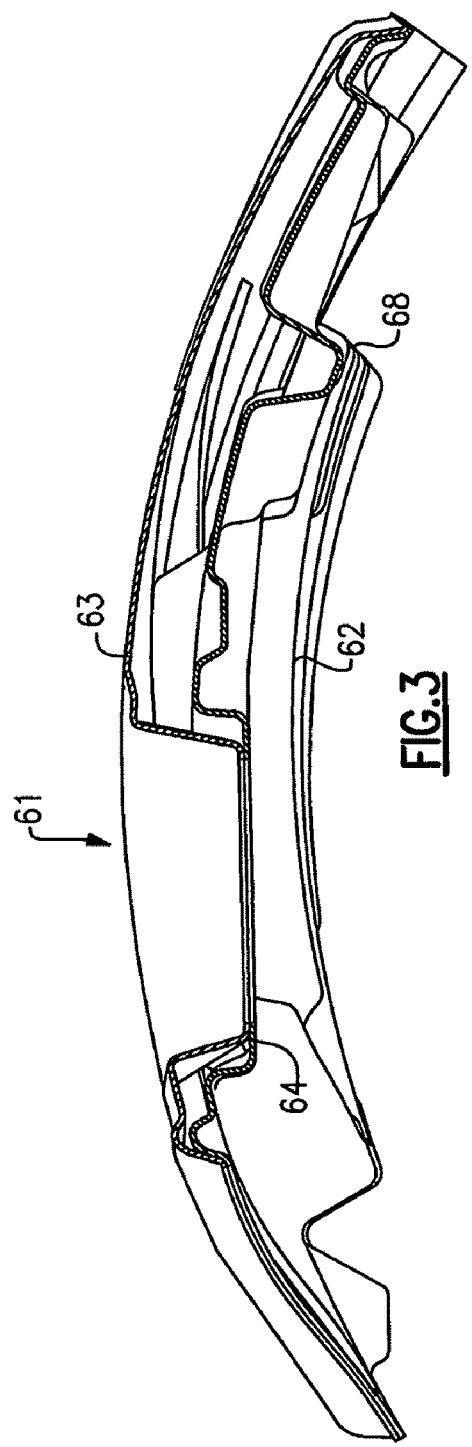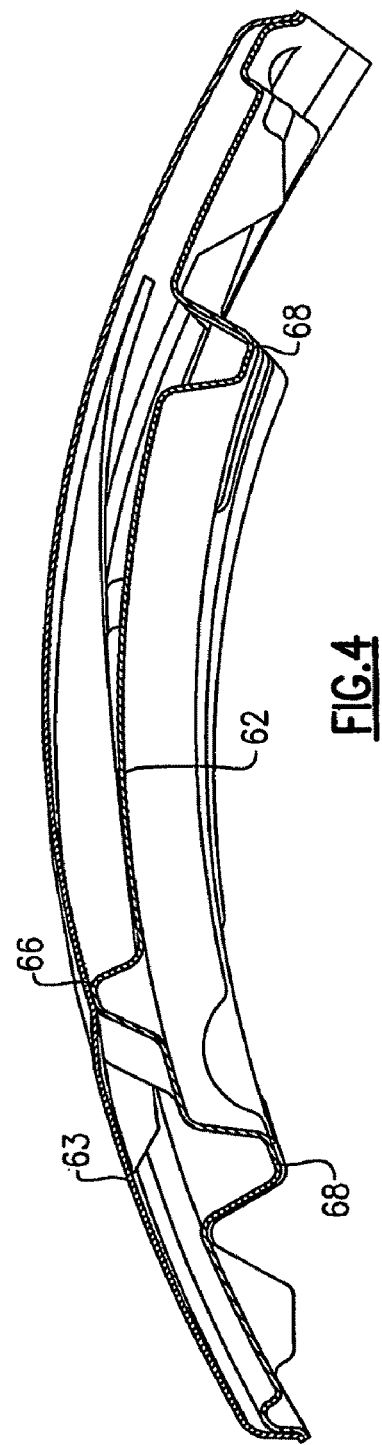

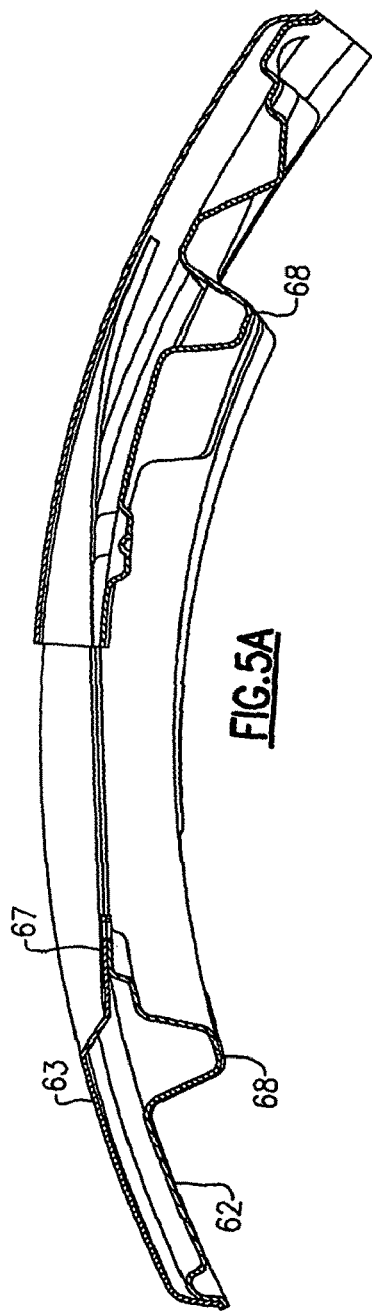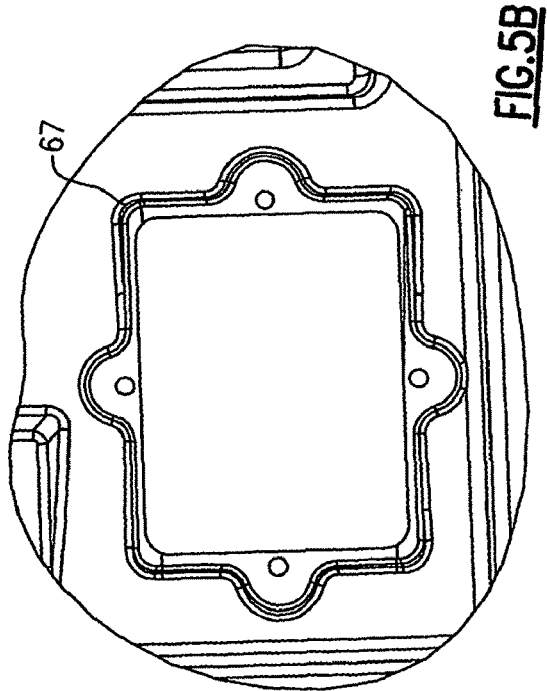

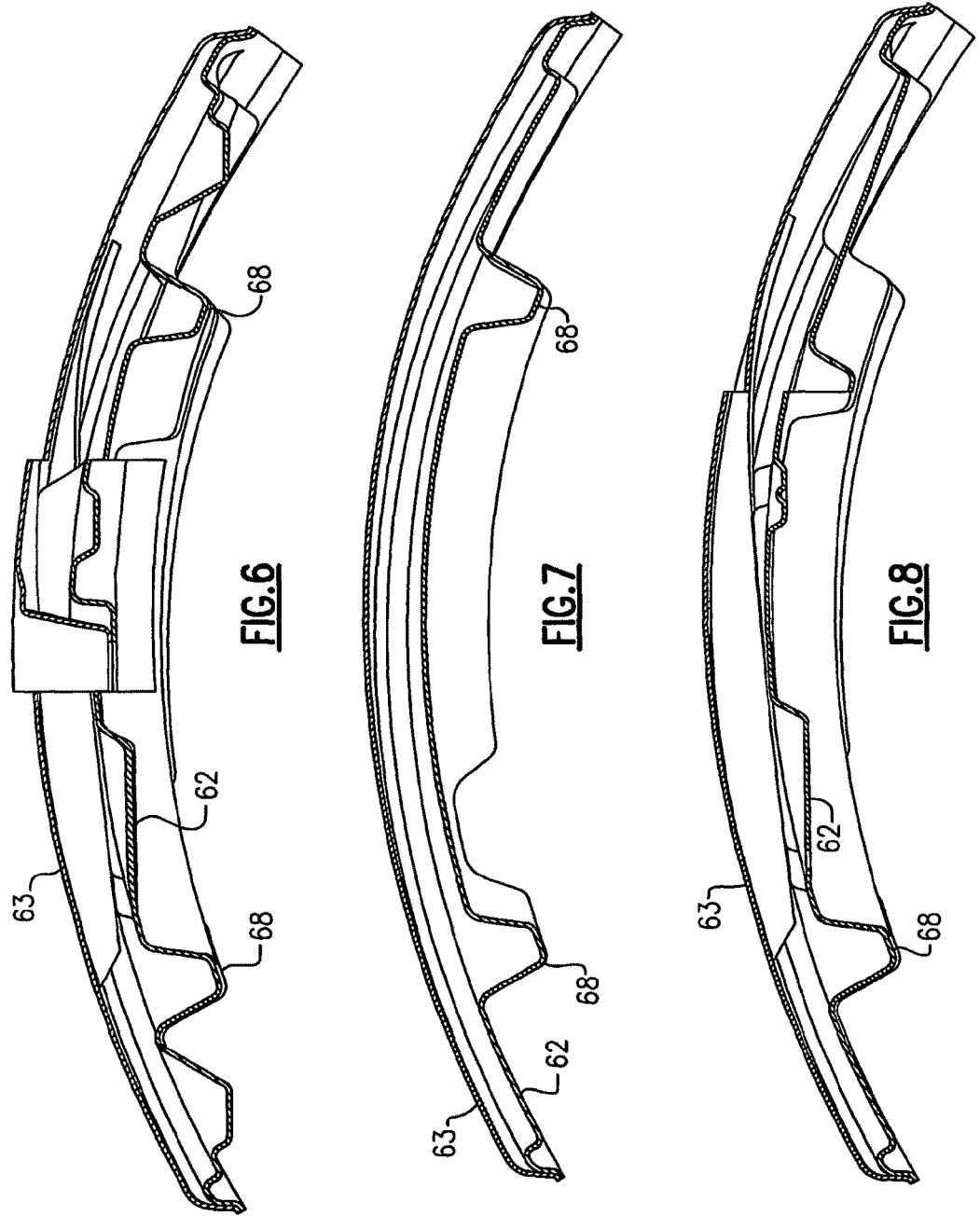

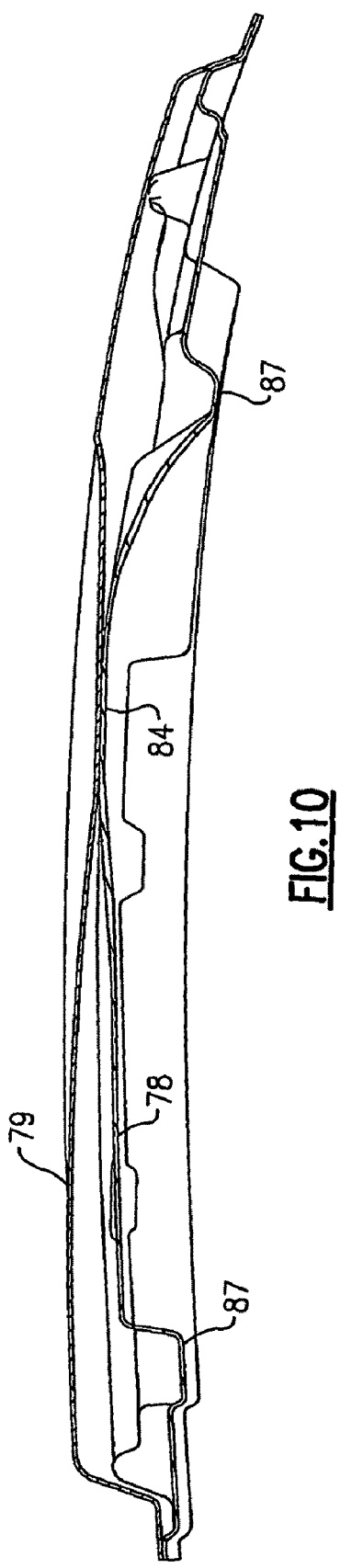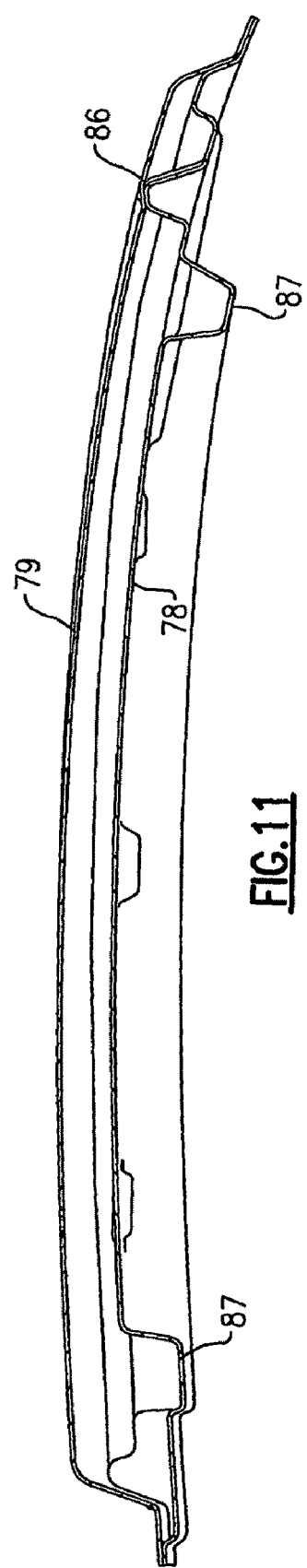

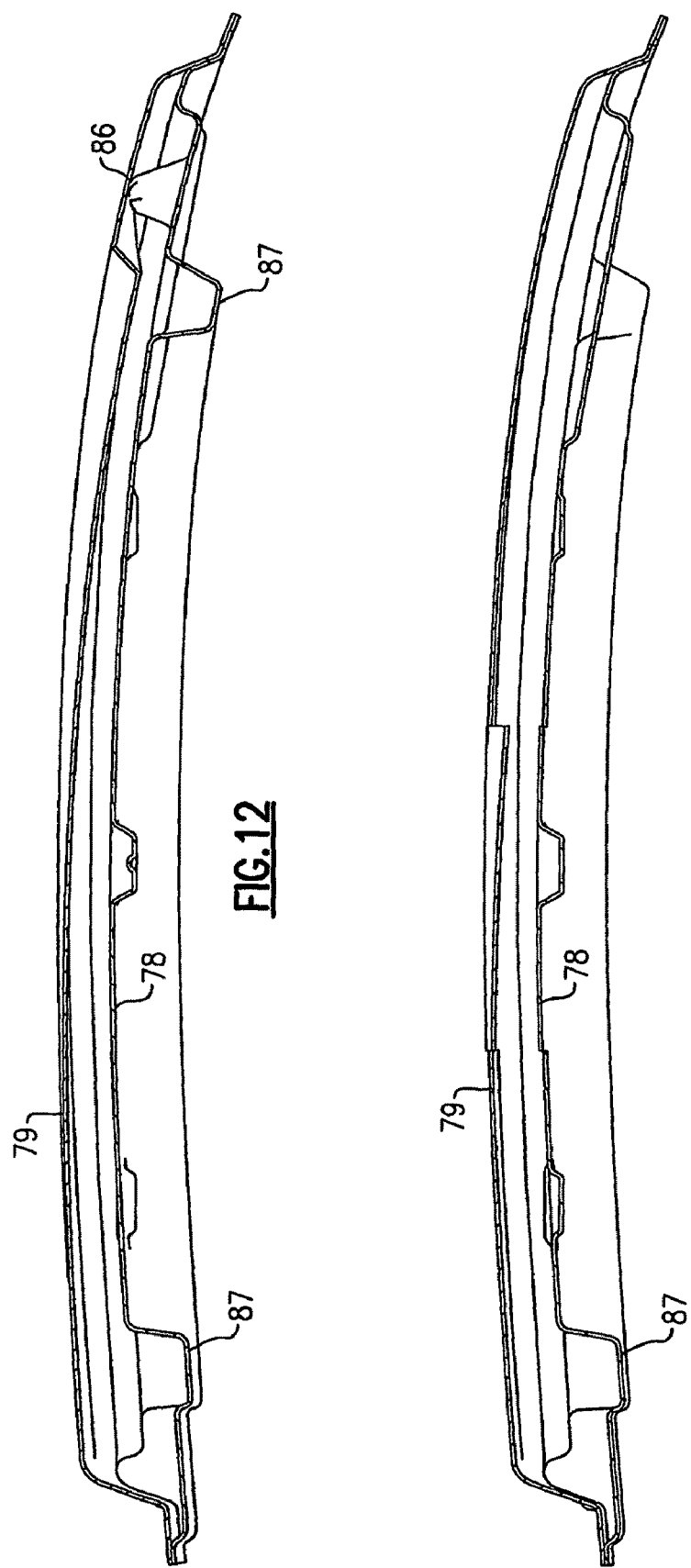

COMPOSITE DOORS FOR TRANSPORT REFRIGERATION UNIT

FIELD OF THE INVENTION

The present invention relates generally to the art of transport refrigeration units and in particular to outer protective covers for such units.

A typical transport refrigeration unit of the type designed for mounting on the front face of a tractor trailer unit comprises a one piece, self-contained fully refrigerant charged, prewired, refrigerant/heating unit powered by a diesel engine. In such a design the evaporator fits into a rectangular opening in the upper portion of the trailer front wall. When installed, the evaporator section is located inside the trailer; and the condensing section is outside and on the front of the trailer. The condensing section consists of an engine-compressor drive package, condenser fan, condenser coil, radiator coil, control panel, relay module, refrigerant controls, piping, wiring and associated components.

Structural frame members support all of the components and facilitate attaching of the unit to the trailer front face. Also supported by the structural framework is an outer cover which includes the necessary air inlet and outlet openings for cooling, and doors which may be opened to provide access to the interior of the unit for maintenance and service.

The access doors may include both front and side doors which should be light in weight, having adequate structural strength so as to withstand significant impacts without being damaged structurally or cosmetically, and provide an attractive appearance. They should also have sufficient torsional stiffness to hold their shape and provide adequate sound damping capabilities. Generally a composite structure with a form inner core has been used to obtain these characteristics. The use of foam adds complexity and expense to the manufacturing process.

SUMMARY OF THE INVENTION

In accordance with one embodiment of the invention, the doors of an outer cover of a transport refrigeration unit are formed of inner and outer sheets of plastic material that are bonded by a thermoforming process at their edges to form a rigid composite structure with a hollow space between the two sheets.

In accordance with another aspect of the invention, the doors are made from a thermoplastic olefin material to provide superior strength and improved sound damping characteristics without the need for foam.

By another aspect of the invention, in addition to the edges, the inner and outer sheets are bonded at select other locations to provide improved strength and rigidity capabilities without the need for foam.

In accordance with another aspect of the invention, the inner sheet of a door has a plurality of C-shaped cross sectional ribs disposed therein to provide increased torsional stiffness and strength to the door.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIG. 3 is a sectional view thereof as seen along lines E-E of FIG. 2A.

FIG. 4 is a sectional view thereof as seen along lines D-D of FIG. 2A.

FIGS. 5A and 5B are sectional and partial views thereof as seen along lines H-H of FIG. 2A.

FIG. 6 is a sectional view thereof as seen along lines A-A of FIG. 2A.

FIG. 7 is a sectional view thereof as seen along lines C-C of FIG. 2A.

FIG. 8 is a sectional view thereof as seen along lines F-F of FIG. 2A.

FIG. 10 is a sectional view thereof as seen long lines C-C of FIG. 9A.

FIG. 11 is a sectional view thereof as seen long lines G-G of FIG. 9A.

FIG. 12 is a sectional view thereof as seen long lines D-D of FIG. 9A.

FIG. 13 is a sectional view thereof as seen long lines A-A of FIG. 9A.

DETAILED DESCRIPTION OF THE PREFERRED EMBODIMENT

Figure 1:
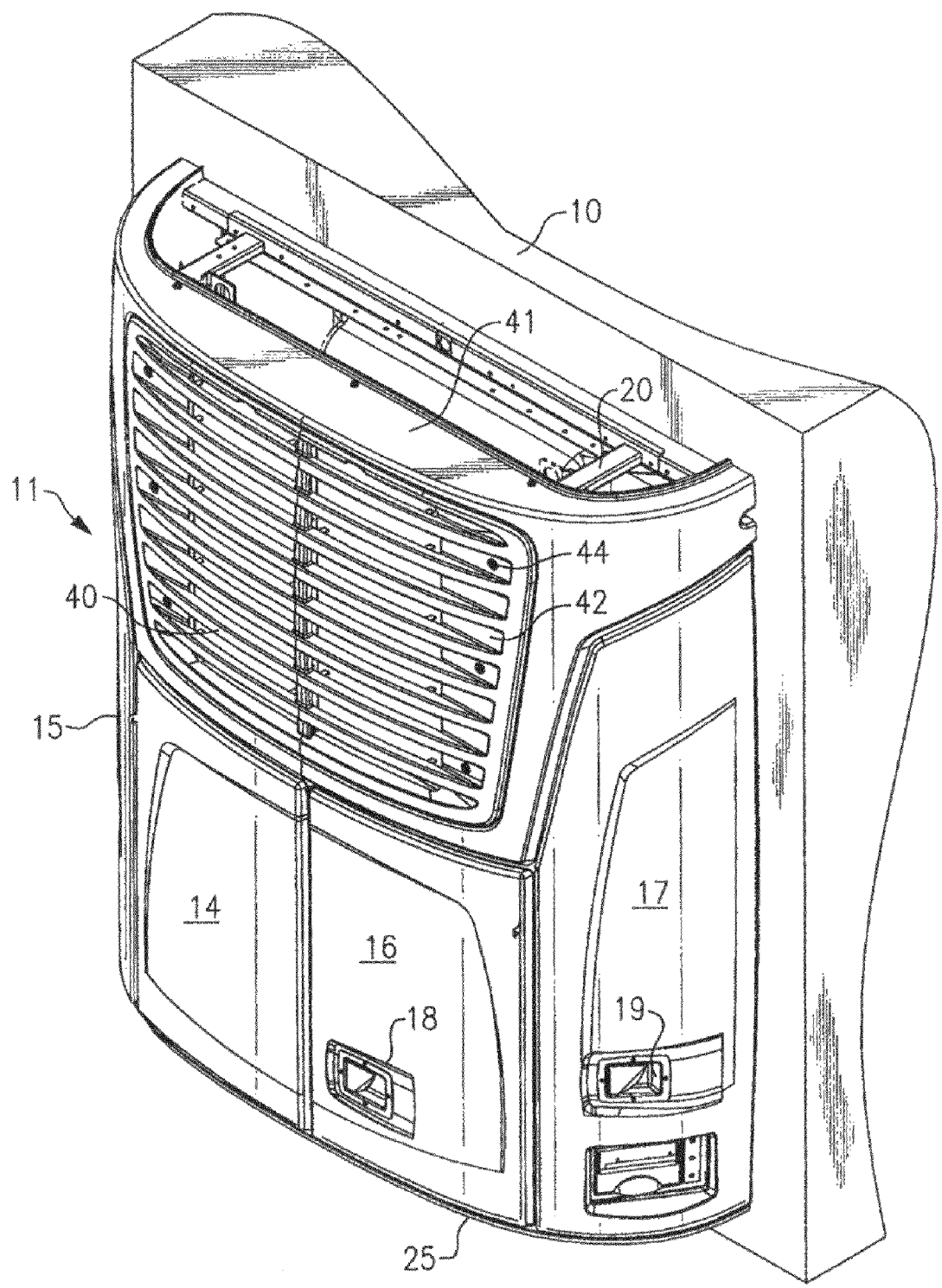
FIG. 1 is a perspective view of a transport refrigeration unit having the front doors open and being fabricated in accordance with the present invention.

In FIG. 1 a fragmentary front part of a large transport trailer 10 is shown with a transport refrigeration unit 11 according to the invention shown mounted on the front wall 12 of the trailer. For purposes of the present description the terms "roadside" and "curbside" will be used in describing various components of the refrigeration unit and its cover. As viewed in FIG. 1, the right hand side of the unit will be referred to as the roadside and the left hand side of the unit as the curbside of the unit.

With this reference, the unit as illustrated in FIG. 1 has the curbside front door 14, and, the roadside front door 16 of the unit cover in their closed positions but containing the inner structural components of the unit as well as some of the components of the refrigeration unit itself. Attachment of the refrigeration unit 11 to the trailer 10 is carried out by connection of an outer peripheral planar structural steel framework illustrated generally by reference numeral 20. It should be appreciated that this framework is not normally visible when the unit is properly installed on a trailer unit, however for purposes of illustration, at least a portion of the structural framework is illustrated in FIG. 1.

All of the component assemblies which define the outer cover of the refrigeration unit 11 are mounted to the various structural components. Each of the doors forming the lower portion of the cover are made from a tough, light-weight composite material designed to resist rust, denting, warping, fading or peeling of their outer finish. Their construction will be described in more detail hereinbelow. These components include the front curbside door 14 and the front roadside door 16 previously referred to above. They also include the curbside outer door 15 and roadside outer door 17.

The front doors 14 and 16 are vertically hinged at their respective outer edges to provide a large access opening at the front of the unit. The side doors 15 and 17 are vertically hinged at their rear edges such that they pivot open from front to back. Latches 18 and 19 are provided for latching and unlatching the front roadside door 16 and side roadside door 17, respectively The upper part of the unit cover comprises a rigid front grille member 40 and a flexible support structure 41 disposed in surrounding relationship therewith. The grille member 40 is positioned in overlying relationship with the condenser heat exchanger of the refrigeration unit and is provided with a large number of openings 42 therethrough to facilitate air flow for efficient heat transfer. The support member 41 is secured to the frame 20 and the front grille is fastened to the support structure 41 by appropriate fastening means as at 44.

A cover bottom panel 25 is attached to the unit for purposes of closure and to improve the aesthetics of the unit.

It will be appreciated therefore that the door and grille components described above are designed to cooperate to fully enclose the refrigeration unit 11 to provide protection from the environment and road hazards and to aerodynamically and aesthetically enhance the unit.

Referring now to FIGS. 2-8, the features of the curbside outer door 15 will now be described. Rear and front views of the curbside outer door 15 are shown in FIGS. 2A and 2B, respectively. The rear edge 51 of the door 15 is planar in form and is linked to the frame by hinges 52 and 53 such that the doors 15 opens in a front-to-back relationship to thereby provide easy access to the components therein. The front edge 54 of the door 15 has angled portions 56 and 57 and a planar portion 58 as shown. The bottom edge is shown at 55. When the door 15 is in the closed position, the planar portion 58 abuts the outer edge of the curbside front door 14, and the angled portions 57 and 58 abut the outer edges of the grille flexible element. The bottom edge 55 abuts a bottom cover.

A latch mechanism 59 is provided for locking the door 15 in its closed position or for unlocking the door 15 for purposes of opening the door by rotating it on its hinges 52 and 53.

Near the top of the door 15 is an opening 61 which is provided for the purpose of accommodating the attachment of a fresh air exchange feature.

Considering now the construction of the door 15, it is formed of an inner sheet 62 and an outer sheet 63 of a high strength plastic material such as thermoplastic olefin (TPO). The inner and outer sheets 62 and 63 are bonded together at their edges by a thermoforming bonding process. That is, along the entirety of each of the edges 51, 54 and 55, the two sheets 62 and 63 are joined by thermoforming bonding so as to thereby provide a hollow space between the two sheets. The process of joining the two sheets in this manner is often referred to as "twinning".

In addition to the twinning at the perimeter of the inner and outer sheets 62 and 63, in order to provide structural rigidity and strength to the combination, the two sheets 62 and 63 are joined by a twinning process at certain locations within the perimeter of the door. These locations are indicated by the numerals 64, 66 and 67 in FIG. 2A.

As will be seen in FIG. 3, at the periphery of the opening 61, the inner and outer sheets 62 and 63 are joined, or twinned, around the entire periphery of the opening 61 as shown by the rib at 64.

Figure 2A:
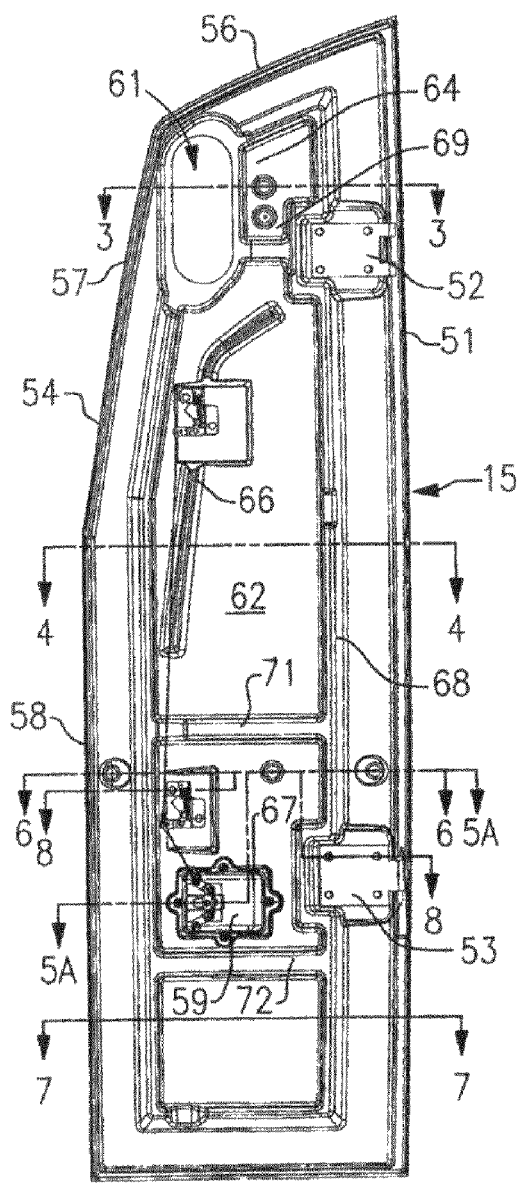
FIGS. 2A and 2B are rear and front views of a curb side outer door in accordance with one aspect of the present invention.
Figure 2B:
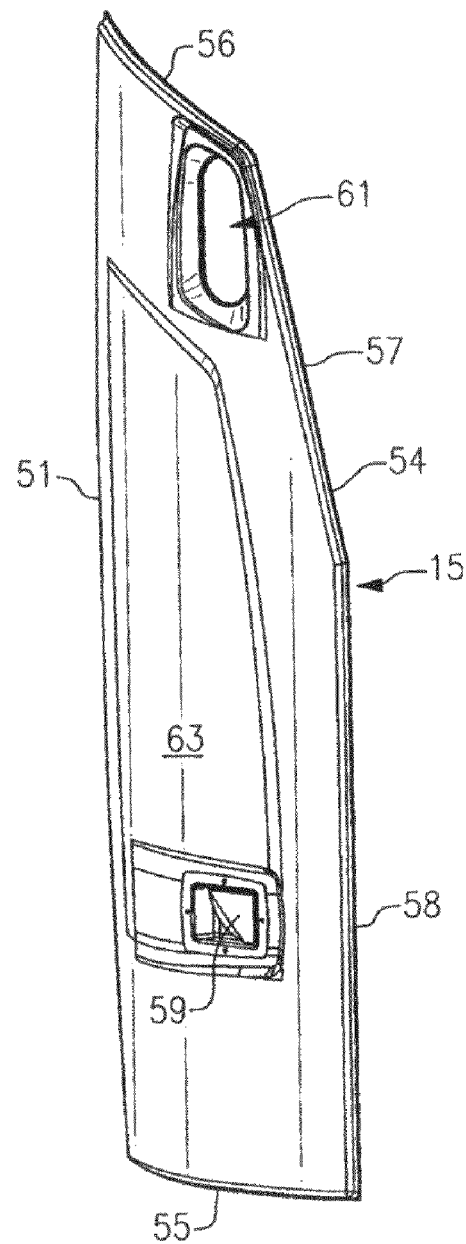

Near the central area of the structure, it will be seen in FIG. 2A that the twinning rib as shown at 66 extends substantially ⅓ of the length of the structure. This can be seen in the cross-sectional view of FIG. 4. Because of the central location and the length of the twinned rib 66, this rib adds substantially to the strength and rigidity of the combination.

In the area framing the latch mechanism 59, the two sheets 62 and 63 are joined by the continuous twinning rib 67 as shown in FIGS. 5A and 5B.

In addition to the twinning rib as described hereinabove, the inner sheet 62 also has a built in rib structure 68, having a C-shaped cross section which is provided around the entire perimeter (i.e. inwardly offset from each of the edges 51, 54 and 55). This rib structure 68 is shown in FIGS. 3, 4 and 5 as described hereinabove, as well as in FIGS. 6, 7 and 8.

In addition to the continuous perimeter rib structure 68 as described hereinabove, horizontal rib structures 69, 71 and 72 have the same C-shaped cross section as the rib structure 68 and add further strength and torsional rigidity to the combination.

Having described the curbside outer door 15, the curbside front door 14 will now be described. The door 14 is shown from the inner side and outer side in FIGS. 9A and 9B, respectively.

The curbside front door 14 has an outer edge 73, an inner edge 74, a top edge 76 and a bottom edge 77. Similar to the curbside outer door 15 as described hereinabove, the front door 15 comprises an inner sheet 78 and an outer sheet 79 which are joined, or twinned together at their edges 73, 74, 76 and 77 to form a rigid hollow structure. Again, the edges are formed along their entire length by a thermoforming bonding process. Again, the material is a plastic material and preferably a thermoplastic olefin (TPO).

Located near the outer edge 73 is a pair of spaced hinges 81 and 82 for pivotally attaching the door 14 to the frame of the cover. Both the curbside outer door 15 and the roadside outer door (not shown) are hinged at their outer edges such that their inner edges 74 open forwardly. The lip 83 on the inner edge 74 extends inwardly and mates in an overlapping relationship with a similar lip on the roadside front door, with the curbside front door closing first and the roadside door having its lip overlapping the lip 83 of the curbside front door 14. A latch on the roadside front door secures the two doors in the closed position and allows them to be opened for purposes of gaining access to the internal components.

In addition to the twinning at the perimeter of the door 14, there are additional twinning ribs established at locations other than the perimeter as shown at 84 and 86. The twinning rib 84 is disposed horizontally and extends about half way across the width of the door 14. The cross sectional view of this rib 84 is shown in FIG. 10.

Figure 9A:
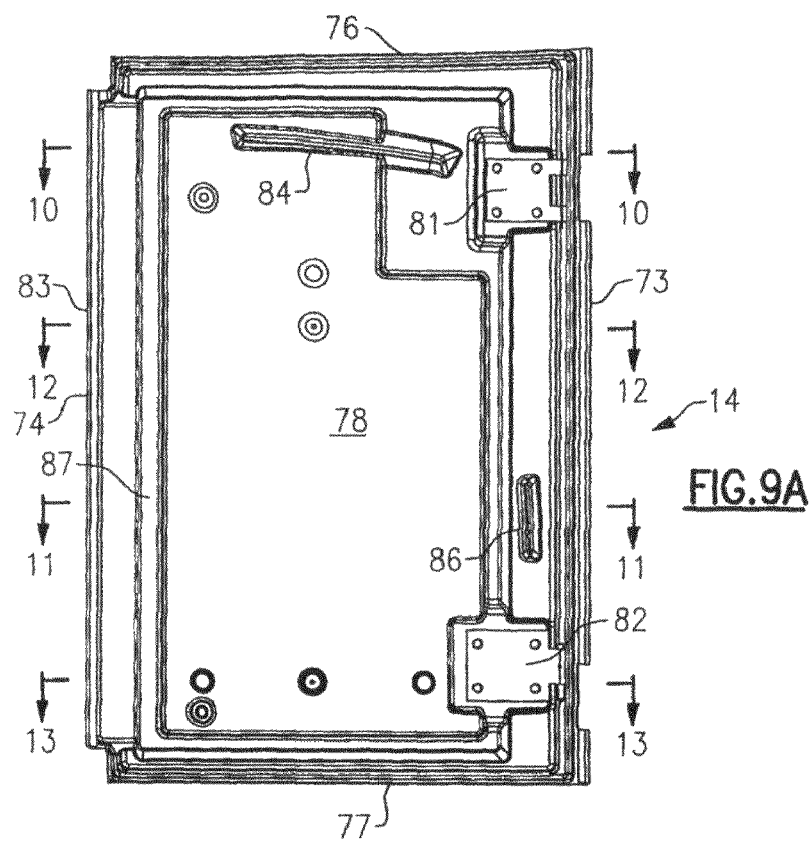
FIGS. 9A and 9B are rear and front views of a curb side front door in accordance with one aspect of the present invention.
Figure 9B:
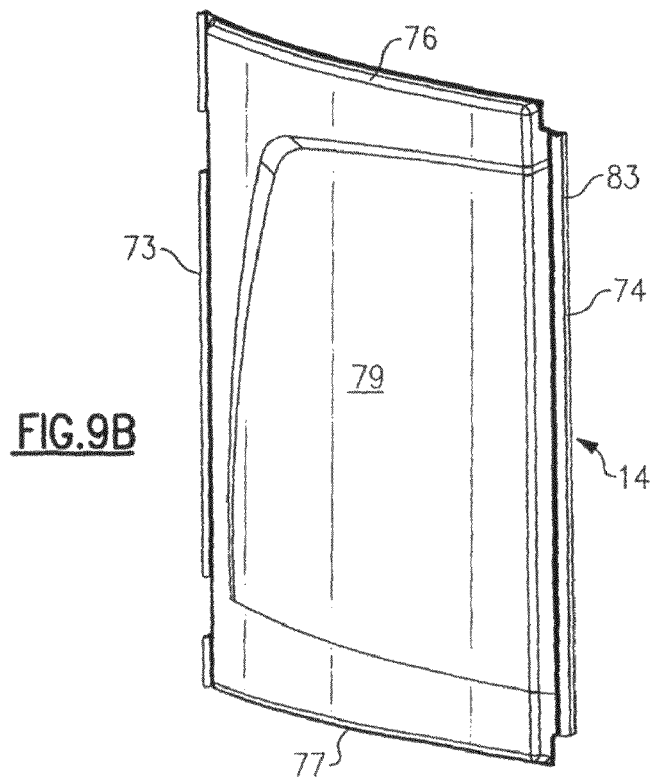

The twinning rib 86 is disposed vertically, and is located near the outer edge 73 as shown in FIG. 9A. The cross-sectional view of the twinning rib 86 is shown in FIG. 11.

Similar to the twinning rib in the curbside outer door 15, the twinning ribs 84 and 86 provide torsional rigidity and strength to the curbside front door 14.

In order to provide further torsional stiffness and strength to the front door 14, a rib structure 87 having a C-shaped cross section is provided near the periphery (i.e. spaced inwardly from the edges 73, 74, 76 and 77) as shown in FIG. 9A, in a manner similar to that of the rib structure of the curbside outer door as described hereinabove. These ribs 87 are shown in cross-sectional views in FIGS. 10 and 11 as described hereinabove, as well as in FIGS. 12 and 13.

Only the curbside doors have been described above. However, it should be understood that the roadside doors are substantially the same and therefore, the discussion should be considered relevant to them as well.

We claim:

1. A transport refrigeration unit of the type adapted to be mounted on a front wall of a trailer for conditioning an interior of the trailer, the unit having a structural frame which includes a section to be attached to the trailer, and vertically extending members spaced from the front of the trailer for supporting a front cover for enclosing the refrigeration unit, wherein the front cover includes a plurality of doors, with at least one of said doors comprising:
- a body having an inner sheet and an outer sheet with both sheets being formed of a plastic material and both having a peripheral edge; and
- a joint formed between the peripheral edge of said inner sheet and the peripheral edge of said outer sheet, said joint being formed by a thermoforming process such that the peripheral edges of said inner and outer sheets are integrally bonded together to provide a hollow space between said inner and outer sheets.

2. A transport refrigeration unit as set forth in claim 1 wherein said plastic material comprises a thermoplastic olefin.

3. A transport refrigeration unit as set forth in claim 1 wherein said at least one door includes at least one area other than said peripheral edges wherein said inner and outer sheets are bonded together.

4. A transport refrigeration unit as set forth in claim 3 wherein said integral bonding in the at least one area other than said peripheral edges extends generally in a longitudinal direction for at least about one-third the length of said door.

5. A transport refrigeration unit as set forth in claim 3 wherein said integral bonding in the at least one area other than said peripheral edges extends generally in the transverse direction along at least about half the width of said door.

6. A transport refrigeration unit as set forth in claim 1 wherein said door includes at least one rib formed in one of said sheets said rib being generally C-shaped in cross-sectional form and providing structural rigidity to the door.

7. A transport refrigeration unit as set forth in claim 6 wherein said rib is formed in said inner sheet.

8. A transport refrigeration unit as set forth in claim 6 wherein said rib is formed near, and extends substantially the entire length of said peripheral edge.

9. A transport refrigeration unit as set forth in claim 6 wherein said rib further includes at least one transversely extending rib other than said peripherally extending rib.

10. A transport refrigeration unit as set forth in claim 1 wherein said door is located in the front of said front cover and extends from a midpoint thereof to one side thereof.

11. A transport refrigeration unit as set forth in claim 1 wherein said door is a side door and extends obliquely along one side of said front cover.

12. A method of forming a door for a front cover for a transport refrigeration unit of the type adapted to be mounted on a front wall of a trailer for conditioning an interior of the trailer, the transport refrigeration unit having a structural frame which includes a section to be attached to the trailer, vertically extending members spaced from the front of the trailer for supporting a front collar for enclosing the transport refrigeration unit, comprising the steps of:
- providing inner and outer sheets of plastic material with each of said sheets having a plurality of edges; and
- integrally bonding the plurality of edges of said inner sheet to the plurality of edges of said outer sheet by a thermoforming process to provide a composite structure with a hollow space between inner and outer sheets.

13. A method as set forth in claim 12 wherein said plastic material comprises a thermoplastic olefin.

14. A method as set forth in claim 12 and including the further step of integrally bonding said outer and inner sheets in at least one area other than their respective edges.

15. A method as set forth in claim 14 wherein integral bonding in the at least one area other than their respective edges extends generally in a longitudinal direction so at least about one third the length of said door.

16. A method as set forth in claim 14 wherein said integral bonding in the at least one area other than their respective edges extends generally in the transverse direction along at least about half the width of the door.

17. A method as set forth in claim 12 and including the step of forming at least one rib in one of said sheets, said rib being generally C-shaped in cross sectional form and providing structural rigidity to the door.

18. A method as set forth in claim 17 wherein said rib is formed in said inner sheet.

19. A method as set forth in claim 17 wherein said rib is formed near, and extends substantially the entire length of said peripheral edge.

20. A method as set forth in claim 7 wherein said rib further includes at least one transversely extending rib other than said peripherally extending rib.

21. A method as set forth in claim 17 wherein said door is located in the front of said front cover and extends from a midpoint thereof to one side thereof.

22. A method as set forth in claim 12 wherein said door is a side door and extends obliquely along one side of said front cover.

23. A method as set forth in claim 1 wherein said hollow space contains no frame.

* * * * *